(12) United States Patent
Presley (10) Patent No.: US 8,266,201 B2
(45) Date of Patent: Sep. 11, 2012

(54) SYSTEM AND METHOD FOR DISTRIBUTING PROCESSING OF A SINGLE-PROCESS APPLICATION HAVING FIRST AND SECOND OBJECTS IN A NETWORK HAVING LOCAL AND REMOTE PROCESSES

(75) Inventor: Matthew T. Presley, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 149 days.

(21) Appl. No.: 12/749,278

(22) Filed: Mar. 29, 2010

(65) Prior Publication Data

US 2011/0238722 A1 Sep. 29, 2011

(51) Int. Cl.
G06F 15/16 (2006.01)
G06F 15/173 (2006.01)
G06F 15/177 (2006.01)

(52) U.S. Cl. ......... 709/201; 709/203; 709/219; 719/317

(58) Field of Classification Search ................... 709/201, 709/217–228; 719/311–332
See application file for complete search history.

(56) References Cited

U.S. PATENT DOCUMENTS

| | | | | |
|---|---|---|---|---|
| 5,896,532 | A * | 4/1999 | Blewett | 719/310 |
| 7,203,926 | B2 * | 4/2007 | Bogle et al. | 717/124 |
| 7,379,978 | B2 * | 5/2008 | Anderson et al. | 709/219 |
| 7,546,602 | B2 * | 6/2009 | Hejlsberg et al. | 719/313 |
| 2007/0094675 | A1 * | 4/2007 | Ryan | 719/330 |
| 2008/0201568 | A1 * | 8/2008 | Quinn et al. | 713/1 |
| 2008/0282266 | A1 * | 11/2008 | Kabanov | 719/320 |
| 2009/0276431 | A1 * | 11/2009 | Lind et al. | 707/8 |
| 2009/0276483 | A1 * | 11/2009 | Lind et al. | 709/201 |
| 2009/0276658 | A1 * | 11/2009 | Lind et al. | 714/4 |
| 2009/0276754 | A1 * | 11/2009 | Lind et al. | 717/106 |
| 2011/0088043 | A1 * | 4/2011 | Lind et al. | 719/316 |
| 2011/0138385 | A1 * | 6/2011 | Schmelter et al. | 718/1 |

OTHER PUBLICATIONS

Tatsubori, "A bytecode translator for distributed execution of 'legacy' Java software," 271th PPT, Ohokayama, Japan, Jul. 19, 2001, 30 pages.
Tatsubori et al., "A bytecode translator for distributed execution of 'legacy' Java software," J. Lindskov Knudsent (Ed.): ECOOP 2001, LNCW 2072, 2001, pp. 236-255, Dec. 31.
Tatsubori, "Separation of distribution concerns in distributed Java programming," Addendum to the 2001 Proceedings of the Conference on Object-Oriented Programming, Systems, Languages, and Applications (OOPSLA 2001), Doctoral Symposium, Tampa Bay, Florida, USA, Oct. 14-22, 2001, pp. 19-20.
Tilevich et al., "J-Orchestra: enhancing Java programs with distribution capabilities," ACM Transactions on Software Engineering and Methodology, 19(1), Article 1, Aug. 2009, 40 pages.
Tilevich et al., "NRMI: natural and efficient middleware," IEEE Transactions on Parallel and Distributed Systems, IEEE Trans. Parallel Distrib. Syst. 19(2), 2008, 174-187, Dec. 31.

(Continued)

*Primary Examiner* — Haresh N Patel
(74) *Attorney, Agent, or Firm* — Jones Day; Nicola A. Pisano; Jaime D. Choi (57) ABSTRACT

A computer system and method are provided for making modifications to runtime coding of object-oriented software that enables distributed execution by automatically modifying object class definitions as the objects are loaded into the executing process. The code modifications cause instances of the classes to interact with a distributed runtime system that allows all objects to be transparently migrated between processes, thereby permitting load balancing and periodic maintenance, without manual recoding of the application source code and without need for a priori knowledge of the program flow.

20 Claims, 6 Drawing Sheets

OTHER PUBLICATIONS

Veda, "Application partitioning—a dynamic, runtime, object-level approach," Dissertation, Kanwal Rekhi School of Information Technology, Indian Institute of Technology Bombay, 2006, 68 pages, Dec. 31.

* cited by examiner

SYSTEM AND METHOD FOR DISTRIBUTING PROCESSING OF A SINGLE-PROCESS APPLICATION HAVING FIRST AND SECOND OBJECTS IN A NETWORK HAVING LOCAL AND REMOTE PROCESSES

FIELD OF THE INVENTION

The invention relates to the field of processing of objects within a distributive computer system. More particularly, the present invention relates to the migration and processing of objects within a distributive computer system to enhance load-balancing and system throughput in the face of routine maintenance or other service disruptions.

BACKGROUND OF THE INVENTION

An object-oriented computer program contains interacting objects that carry out specific program logic. Single process programming techniques assume that all objects reside within the same process hosted on a single computer system. Distributed programming systems, on the other hand, are designed to support objects across multiple processes, usually hosted on separate computers. For distributed systems, typically only certain objects explicitly—declared and programmed as "remote" objects by the programmer—can be remotely accessed by other objects. From the perspective of any given object, only remote objects can be invoked remotely, and only local objects can be invoked locally, with the distinction between local and remote objects being fixed by the application code. Thus, changing a local object to a remote object requires reprogramming.

One problem with legacy applications not written for a distributed computing environment is that the applications must be modified to execute across multiple processes. Similarly, current object-oriented distributed computing infrastructures require programmatic specification of which objects can be remotely accessed by classifying the objects into remote objects and local objects. Such classification requires expertise in distributed programming techniques as well as a priori knowledge of the program flow. Legacy applications that were built to run in a single process on a single host often require extensive reprogramming to execute in a distributed environment. Such modifications can be costly, and also require extensive knowledge of program flow and distributed programming expertise, for example, to avoid errors arising from the differing semantics used for remote and local object invocations. Such errors can be extremely time-consuming and difficult to identify and debug.

Another problem with previously-known distributed systems is that invocation of a remote object often uses different semantics than are used to invoke a local object. Specifically, when an object invokes a local object, all parameters are passed according to the semantics defined by the programming language. In Java, for example, all parameter objects and return values are effectively passed by reference, i.e., by passing an object reference in the parameter list. When an object invokes a remote object, the local objects in the parameter list are passed by copy, while the remote objects in the parameter list are passed by reference. Duplication of the local objects requires that those objects be specially tagged and special code is sometimes required to ensure correct copies are made. In Common Object Request Broker Architecture ("CORBA") applications, all of the passed object types must be properly defined in the interface definition language for any object types that are in the method signature of a remote object. Web services, including .NET, require the definition using the web service description language. All of this special coding presents an additional error-prone burden for the programmer. The different invocation semantics also are complicated because, depending on what kind of object is invoked, local or remote, either a reference to a parameter object is passed or a reference to a copy of the object is passed—often leading to numerous programming errors that are difficult to solve.

The ability to migrate objects between processes is useful when executing a program whose objects are spread across multiple hosts. This capability supports dynamic processor and network load balancing. In addition, it facilitates system maintenance because objects can be migrated off of a host requiring upgrades or repair. In many distributed systems, the mapping of objects to processes and hosts must remain fixed throughout a given execution of the program. Even for those programs that support migration, only the remote objects can be migrated. This can be limiting, however, as the number of remote objects is usually much smaller than the number of local objects, and thus constrains the degree of load balancing that can be achieved.

Another short-coming of many previously-known distributed systems is that the mapping of objects to a process is static, i.e., the mapping cannot be reconfigured while the application is running to optimize processor or network load. Even those systems that support migration of objects between processes are limited in their potential mappings because only remote objects can be migrated. In addition, there are typically many more local objects than remote objects, thus adversely impacting the ability of a system administrator to balance network loads.

Yet another problem with static mapping is the inability to perform system maintenance during runtime. When all objects cannot be migrated, then it is not possible to shutdown a host involved in executing a distributed application, e.g., for system upgrade or routine maintenance, without terminating the execution of the application. This planned downtime and resulting service disruption is undesirable for systems requiring high availability.

While most systems do not use dynamic code modification, some techniques are known for supporting the distributed execution of applications. One such system developed by Michiaki Tatsubori of the University of Tsukuba, Japan, and called Addistant, uses code modification to support automatic distributed execution of legacy Java software. At class definition load time, that is, class file loading in Java terms, the system modifies the bytecode of the Java class, so that objects based on the modified classes can execute within a process distinct from the main process of the application. A number of modification techniques are used to achieve this effect. However, Addistant does not support dynamic migration of objects, and the mapping of objects to processes and hosts is explicit and static. Thus, the administrator must define a runtime policy file that indicates which objects, which may be grouped by class, run on which processes. Consequently, the static mapping precludes dynamic processor and network load balancing, as there is no way to move all objects off of a host for system maintenance purposes without halting and restarting the application.

It would therefore be desirable to provide a system and methods that overcome these and other disadvantages of previously-known systems.

SUMMARY OF THE INVENTION

The present invention overcomes the shortcomings of previously-known systems and methods of adapting single-process legacy systems and distributed applications by modifying object classes during load time. The systems and methods of the present invention therefore provide a computer method for distributive processing of an object on a plurality of processes.

In accordance with another aspect of the present invention, a computer method and system are provided for modifying object classes during load time and generating object interfaces that permit coordination with processes resident on remote hosts of a distributed system. The modified object classes of the present invention therefore enable migration of objects, and improve network load-balancing in a distributed processing environment and system utilization during planned system outages or other service disruptions.

In accordance with one aspect of the present invention, a computer system and method are provided for making modifications to runtime coding of object-oriented software that enables distributed execution. The method automatically modifies object class definitions as the objects are loaded into the executing process. More particularly, the code modifications cause instances of the classes to interact with a distributed runtime system that allows all objects to be migrated between processes. Because the class definitions are modified at runtime, a programmer does not need to add any code for application distribution. Thus, no programmer expertise in distributed systems is necessary, nor any a priori knowledge of the program flow. Moreover, no modification to the source code is required, thus obviating the need to reprogram legacy applications. Instead, the distributed execution capability is transparently and automatically added to the application. Because all objects can now be migrated, processor and network load balancing is more flexible, allowing for more refined adjustments. All objects can be migrated off of any host, allowing the administrator to take hosts offline for system maintenance without terminating execution of the application.

In accordance with the invention, the method supports local and remote invocations on an object using identical invocation semantics, thereby allowing all objects to be migrated at any time. Migration of objects between processes is handled by the system, so that invocations on an object migrate the object between processes.

The system and method of the present invention comprise a class modifier routine and a runtime system that operate within the process of an executing object-oriented computer program. The class modifier alters class definitions when the class definitions are loaded into the executing process, so that objects interact with the runtime system when created or invoked. Interprocess invocations between objects are automatically handled by the runtime system, thus preserving original local invocation semantics. All of the class modifications are performed transparently so no extra programming or expertise is required to execute applications with distributed systems or migrated objects. And because the method runs during runtime, no source code modifications are required to execute legacy applications on a distributed system.

These and other advantages will become more apparent from the following detailed description of the preferred embodiments.

DETAILED DESCRIPTION

Figure 1:
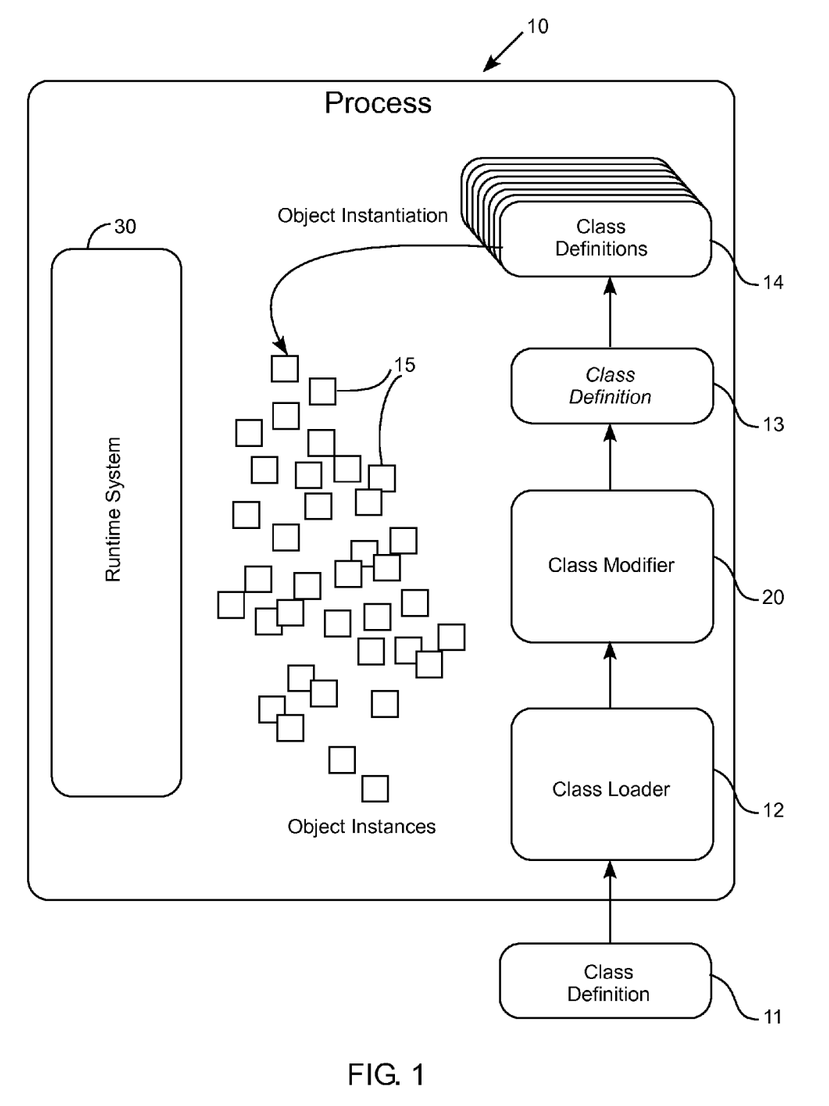
FIG. 1 is a flow diagram schematically illustrating operation the class modifier routine during the application loading process.
Figure 2:
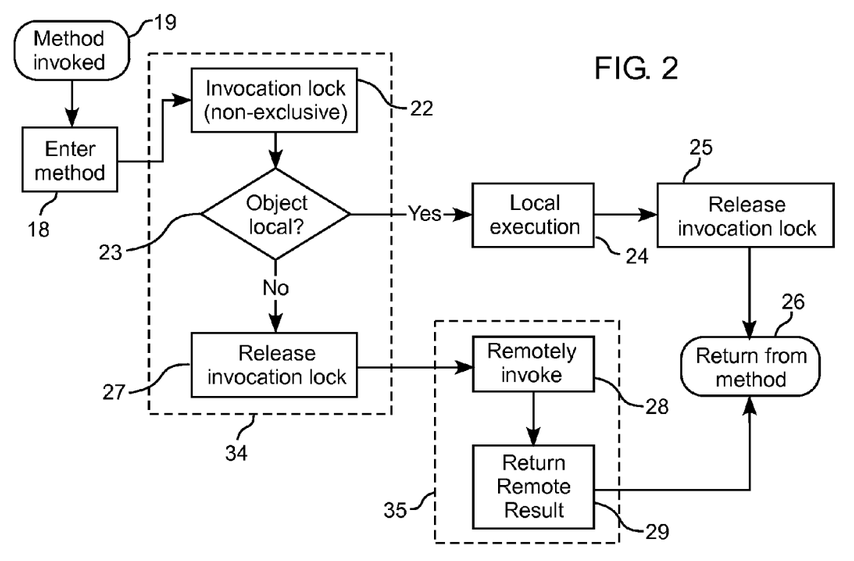
FIG. 2 is a flow diagram depicting operation of the runtime system to resolve object invocations in a distributed object process.
Figure 3:
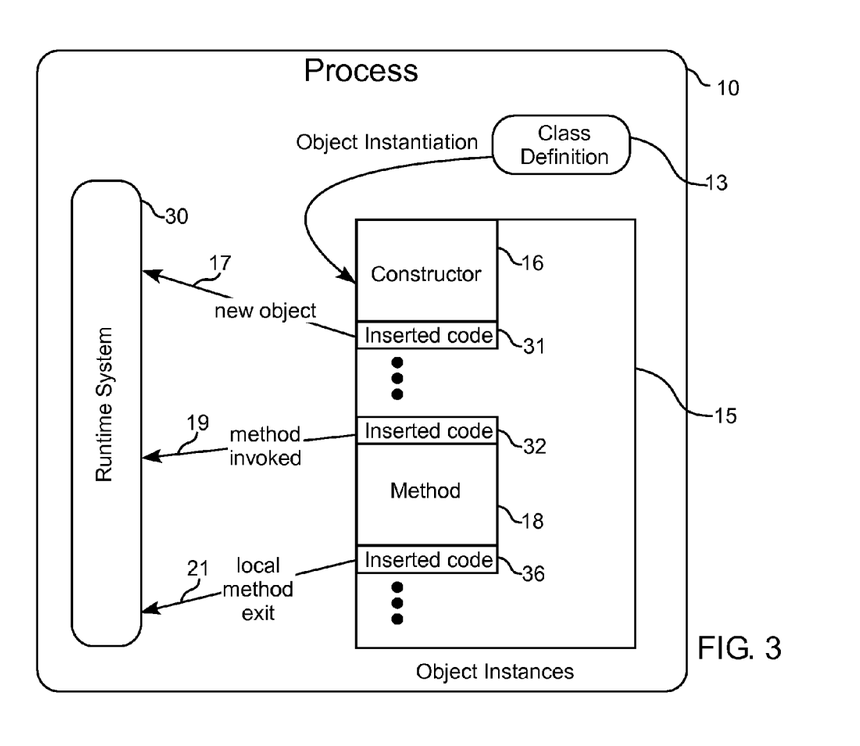
FIG. 3 is a schematic diagram further illustrating the interaction of an instantiation of an object and the runtime system.

Referring to FIGS. 1 through 3, an overview of the system and methods of the present invention is provided, which enable previously-known single process legacy applications to be executed with distributed processes and objects. The inventive system supplements the runtime systems of previously-known computer systems by using dynamic aspect-oriented techniques to modify programs at runtime, thereby enabling distributed object execution, including interprocess object migration, with no modification of the original application source code or a priori knowledge of the process flow. Any object can be migrated in the inventive system to enhance load balancing. External utilities may be used to monitor program execution and to migrate objects between processes as needed, thereby facilitating system maintenance without service disruption.

The method and system of the present invention is designed for use with previously-known object-oriented applications. An application can have one or more classes, wherein each class is defined by a class definition, which in turn defines one or more functions and data used by those functions. The class definitions are loaded from a definition source, such as a file system or web site. The application includes one or more instantiations of each class called objects, with functions and data of the objects defined by class definitions of the application. Multiple objects can be created from the same class definition. During execution of the application, the definition of a class referenced by the application is loaded.

In accordance with one aspect of the present invention, object class definitions are modified prior to object instantiation so that a distinction is no longer made between remote and local objects. In the inventive system, any object can be remotely accessed and any object can be migrated between processes, while preserving the invocation semantics as defined by the programming language. Thus, a program developer may write a traditional single process program that is automatically converted by the inventive system and method to a distributed application at runtime.

The inventive system and method include two parts, a class modifier routine and a runtime system. The class modifier routine alters program class definitions as they are loaded into the application. These modifications cause the classes to invoke the runtime system at the start and end of each method defined for the object, including the object's initialization method typically known as the "constructor." The runtime system is responsible for determining the actual location of an object for invocation purposes and for implementing requests for object migration.

Referring to FIG. 1, the various components of process 10 utilizing the features of the present invention is described, within which both class modifier routine 20 and runtime system 30 are embedded. As will be apparent to one of ordinary skill, the details of embedding class modifier routine 20 into the class loading mechanism of the application will depend on the specific language and application runtime system. For example, for Java applications, the standard instrumentation and tool interface may be used for the Java virtual machine. The runtime system is loaded via the dynamic loading mechanism of the process when the class modifier references it.

In previously-known object-oriented systems, class definition 11 typically is loaded by process class loader 12 into a set of class definitions used by the application to create object instances 15. Thus, for example, in the context of Java Virtual Machine (JVM) applications, the class definitions are in the form of Java byte code files loaded from a class definition source such as a file system or network.

In accordance with the present invention, however, class modifier routine 20 causes class loader 12 to pass any class definition 11 loaded by the process to the class modifier routine. Class modifier routine 20 then modifies class definitions 11 to generate modified class definitions 13, which coordinate method invocations with runtime system 30. The modified class definitions 13 are added to the set of class definitions 14 used by the application. Accordingly, whenever an instance 15 of an object is created, it incorporates the modified class definitions 14.

More particularly, class modifier routine 20 modifies the class definition, so that when an object of the class and within the application executes, the application will interact with runtime system 30 to coordinate distributed execution of the objects on a plurality of processors. As described below, class modifier routine 20 modifies the start and end of each function of the class definition so that when objects of the class in the application execute, each will invoke the runtime system at the start and end of each object function. The modification also modifies the object creation function to invoke the runtime system when any object of the class is created. In the JVM, for example, the class definitions are modified by adding Java Bytecodes to the start and end of each function of a class. The additional Java Bytecodes cause the object to invoke the runtime system indicating the entry and exit of each object executed function. The additional Java Bytecodes inserted at the start of the object initialization function, known as the object constructor, indicates to the runtime system that a new object has been created.

The modified class definitions 13 for an application are collected into set 14 using known methods for collecting and tracking loaded class definitions within an object-oriented system. Set 14 of modified class definitions 13 are used when creating an object of that class. When an instance of an object of that class must be created, the application incorporates the corresponding set 14 of modified class definitions.

Referring now also to FIG. 3, in a preferred embodiment, class modifier routine 20 makes at least the following two changes to class definition 13: First, class modifier routine 20 adds to the end of each constructor 16—the class method invoked to initialize a new instance of the object—a call 17 to runtime system 30 to indicate the creation of the new object instance. This call by constructor 16 allows runtime system 30 to create an entry for that object instance and begin tracking it. Second, class modifier routine 20 modifies each class definition 11 to add code to the start and end of each method 18. As further described with respect to FIG. 2, the code inserted at the start of each method 18 makes an initiating call 19 to runtime system 30 when that method is invoked, and an exit call 21 when the method is completed.

As further depicted in FIG. 2, when a method within object 15 is invoked, illustratively method 18, initiating call 19 is made to runtime system 30. Non-exclusive lock 22 is placed on the object referenced while runtime system 30 determines the location of the referenced object at step 23. Non-exclusive lock 22 ensures coordination with runtime system 30, which must obtain an exclusive lock on the object prior to migrating it to another host. Other invocations, from other threads of control, can occur concurrently under the non-exclusive lock. This coordination ensures that invocations on the methods contained within the object will not occur during migration of the object. If the referenced object is determined to reside on the local host, execution of the method continues at step 24 (referred to as "local execution"). At the completion of local execution, code inserted by class modifier routine 20 at the end of method 18 is run that directs runtime system 30, via exit call 21 to release the non-exclusive lock at step 25. Once a return from the method is completed at step 26, execution of succeeding methods of object 15 continues.

If the object referenced by method 18 of object 15 is determined by runtime system 30 to reside on a remote host, then the local object is deemed an object proxy and the invocation lock is released at step 27. Runtime system 30 on the local host then delegates completion of the method to the runtime system residing on the remote host, indicated at step 28. Upon completion of that method on the remote host, via execution of steps 22-25 of the runtime system on the remote host (and corresponding interaction with the remotely located object), results are returned from the remote host at step 29. A return from method 18 is completed at step 26, and execution of succeeding methods of object 15 then continues. In this manner, the local proxy of the referenced object causes the runtime system on the local host to delegate the invocation to the process on which the actual object resides.

Referring again to FIG. 3, interaction between an instantiation of object 15 and runtime system 30 interaction is further described. When a new instance of an object is created, code 31 is inserted by the class modifier routine at the end of constructor 16, which invokes runtime system 30 residing on that host to indicate that new object 15 was created. If an object proxy is being created, constructor 16 is not executed. As described above, when method 18 of object 15 is invoked, code 32 inserted at the start of method 18 by class modifier routine 20 is executed to generate initiating call 19 to runtime system 30. Responsive to initiating call 19, runtime system 30 determines if the referenced object is an object proxy resident on a remote host or an actual object residing on the local host. Following execution of the coordination logic (shown within box 34 of FIG. 2, the method is executed either on that host using the actual referenced object or delegated to the runtime system on the remote host where the actual object resides (shown by dotted line 35 of FIG. 2). In the case of local execution of method i8, upon completion of the method, code 36 inserted by class modifier routine 20 is executed to release the non-exclusive lock on the object, and the locally generated results are then returned to the caller. Where the referenced object is located on a remote host and the local object is an object proxy, runtime system 30 releases the non-exclusive lock and the execution is completed remotely, after which the results received from the remote invocation are returned to the local caller.

Figure 4A:
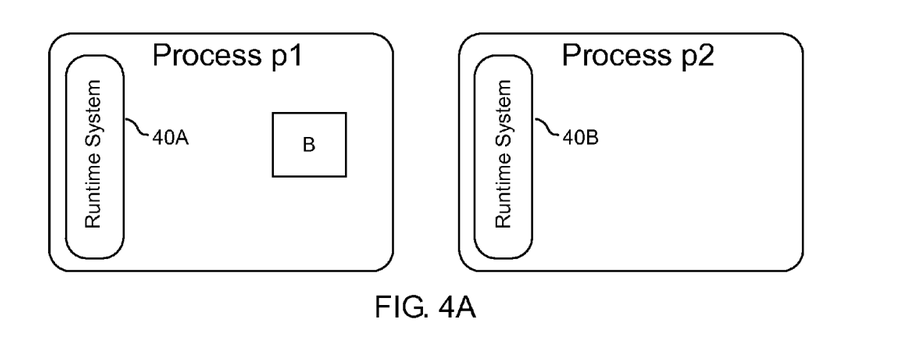
FIGS. 4A and 4B schematically illustrate the process of object migration.
Figure 4B:
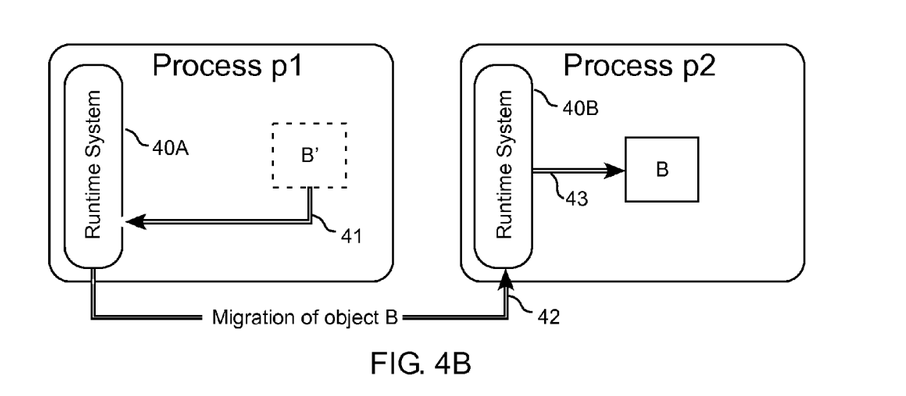

Referring to FIGS. 4A and 4B, one embodiment of the systems and methods of the present invention for migrating an object from a local host to a remote host is now described, wherein the runtime system migrates an object between two processes, local process p1 and remote process p2. Each of local process p1 and remote process p2 has an initial state depicted in FIG. 4A and a final state depicted in FIG. 4B, such that the transformation between the respective initial and final states reflects steps involved in the object migration process.

As will be apparent, the ability to transparently migrate objects between processes and hosts offers the system administrator additional flexibility for load balancing or system maintenance purposes. When an object, B, migrates from process p1 to process p2, the original representation of the object on process p1 becomes an object proxy B' for the new representation of the object, B, on process p2. FIGS. 4A and 4B illustrate migration of object B from process p1 to process p2. In FIG. 4A, object B on process p1 is chosen for migration to process p2 via a call to runtime system 40A. As depicted in FIG. 4B, runtime system 40A on process p1 then extracts the state of object B and transforms it into object proxy B'. The state of object B is transferred by runtime system 40A on process p1 to runtime system 40B on process p2 using known data transfer mechanisms. If no object proxy of B was previously created on process p2, then runtime system 40B on process p2 creates object B using the transferred state received from process p1. If an object proxy already exists for object B on process p2, then runtime system 40B updates the object proxy B with the migrated state and it is deemed the actual representation of object B.

More specifically, FIG. 4A shows object B residing on process p1, with no corresponding object on process p2. When a migration request, which includes the migration destination, is received by runtime system 40A, e.g., from an external utility (not shown), runtime system 40A obtains an exclusive lock on object B on process p1. This is required to ensure that there are no current locks on object B, either exclusively or nonexclusively. Once the exclusive lock is obtained, the migration of object B to remote process p2 commences.

At step 41, runtime system 40A takes the state of object B as an input and creates a serialized form of object B that captures the current state of object B. Any non-primitive data in object B, such as pointers or references to other objects, is specially serialized by runtime system 40A to include a globally unique identifier of the referenced object and the name of the class definition of the referenced object. The output of step 41 is a serialized form of the state of object B suitable for transmission over a network to remote process p2. In the JVM, the serialization of an object cannot use conventional JVM object serialization because JVM does not properly encode object references for the object migration process. Instead, runtime system 40A invokes a special encoder, not shown, that replaces each object reference in the state of the migrating object B with data indicating a globally unique identifier of the referenced object and the class definition name of the object.

In step 42, runtime system 40A of process p1 transmits the serialized form of the migrating object B to the runtime system 40B on remote process p2. Object B resident on the process p1 becomes object proxy W for object B on remote process p2. In a preferred JVM implementation, a socket is maintained between process p1 and process p2, with the data for the state of the transmitted object B transmitted using known socket communications techniques.

In step 43, runtime system 40B on remote process p2 creates object B using the state transmitted from process p1. The state of object B on remote process p2 is identical to the state of that object B at the acquisition of the exclusive lock on object B by runtime system 40A, discussed above. When created, object B on process p2 is considered the actual instance of the object B and may be used by invocations to object B on process p2, while object proxy if remains on process p1.

Figure 5A:
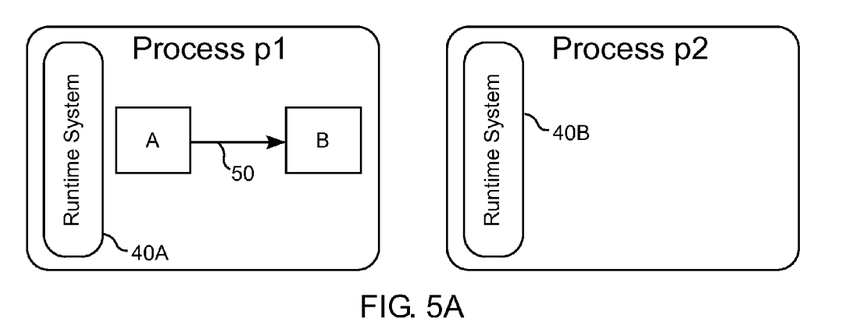
FIGS. 5A through 5C schematically illustrate a process of using an object proxy to invoke an object that has been migrated to a remote host.
Figure 5B:
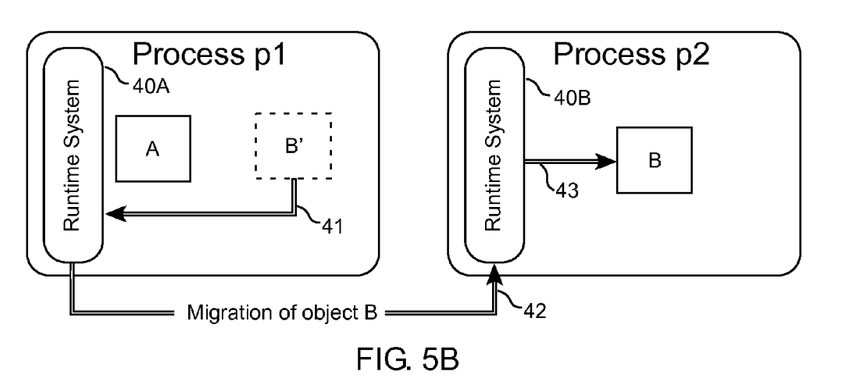

Referring now to FIGS. 5A through 5C, use of object proxies to execute object method invocations is described. Generally, the proxy technique allows the runtime system associated with a process to preserve local invocation semantics even if the invoked object is relatively remote. This technique also provides low overhead on an invocation when the invoked object is co-located on the same process. As depicted in FIG. 5A, when two objects, A and B, are located on the same process, an invocation between those objects is direct (shown by arrow 50), without any intermediate between the two objects. In FIG. 5B, object B later is migrated to process p2 using steps 41, 42 and 43, as described above with respect to FIGS. 4A and 4B, so that object proxy W resides on process p1 and actual object B resides on process p2.

Figure 5C:
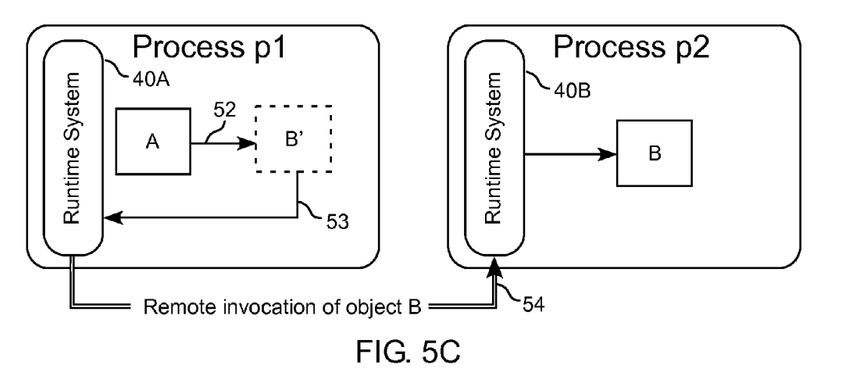

Upon the next invocation of A on B, depicted at 52 in FIG. 5C, object A invokes object proxy B', which was actual object B prior to its migration to process p2. From the perspective of object A, nothing has changed regarding its invocation of object B, as it appears to be invoking the same object as before. However, because the object is now object proxy B', the invocation is handled differently. In this case, object proxy B' invokes runtime system 40A on process p1, as shown at 53, indicating the invoked object, the method, and the method parameters. Runtime system 40A then sends all of that information, indicated at 54 to runtime system 40B on process p2, where actual object B resides. As with object migration, any known networking mechanism may be employed to transfer the invocation data from process p1 to process p2. Runtime system 40B on process p2 then invokes actual object B, as shown at 55, on behalf of object A on process p1. The results returned from the invoked method then are passed back along the reverse route of the invocation to process p1.

More specifically with respect to FIGS. 2 and 5A, when object A on process p1 invokes a function of object B also resident on the process p1, the invocation is executed on process p1 by object B, corresponding to steps 23 and 24 in FIG. 2. In FIG. 5B, object B subsequently migrates from process p1 to remote process p2, as described above with respect to FIGS. 4A and 4B. Next, with respect to FIG. 5C, object A resident on process p1 invokes a function on object proxy B' on process p1. Because object B now resides on remote process p2, runtime system 40A is caused to forward the invocation to process p2, corresponding to steps 27 to 29 in FIG. 2.

In particular, the object proxy B' delegates the function invocation to the runtime system 40A on the process p1, in which the global identifier of object B, the invoked function and the function parameters of object B to invoke are provided to runtime system 40A as input data. Runtime system 40A then transmits this data to runtime system 40B on remote process p2 over a network. In the JVM, the conventional means of transmitting data is user dependent. However, as with the state transfer of objects during object migration, the standard Java Serialization mechanism cannot be used because any references to objects in the function parameters must be modified using the special encoder that replaces object references in the function parameters with data indicating the globally unique identifier of the referenced object and the named class definitions of the objects being communicated.

Runtime system 40B on remote process p2 then invokes the specified function on object B and the function results from object B are returned to runtime system 40B for transmission through runtime system 40A to object proxy B' on process p1.

As such, object A invoked object B that was migrated to remote process p2 for execution of a function of the object B with the function results being returned to object proxy B'. In this manner runtime systems 40A and 40B coordinate to transparently provide migration of object B from process p1 to process p2, without disrupting execution of the methods of object A on process p1.

Figure 6A:
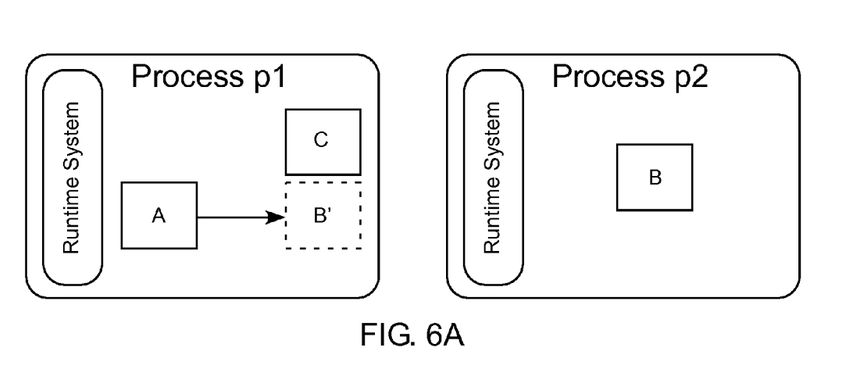
FIGS. 6A through 6C schematically illustrate a process of passing an object by reference in a distributed processing system.
Figure 6B:
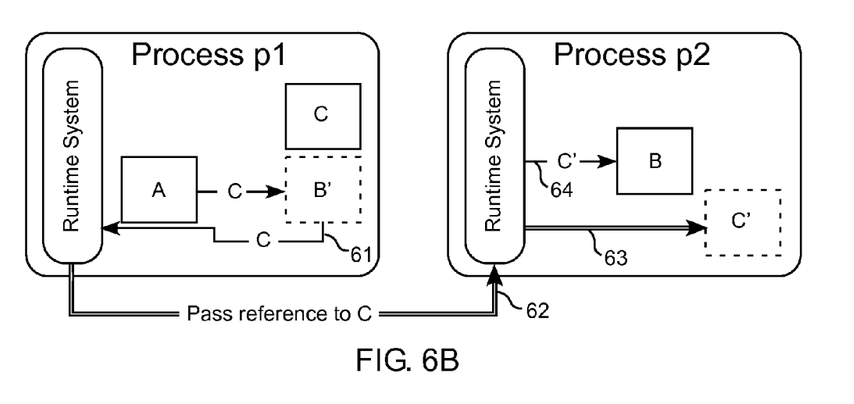
Figure 6C:
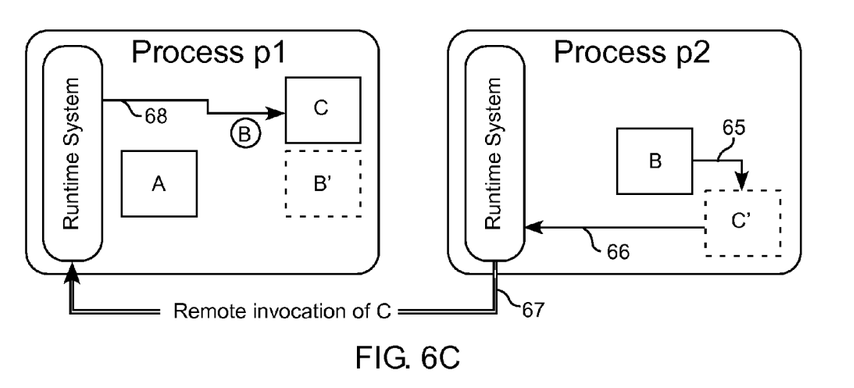

Referring now to FIGS. 6A to 6C, an overview is provided of how object references are passed between objects such that local call semantics are preserved. In FIG. 6A, initial states of processes p1 and p2 are shown, in which objects A and C, and proxy B', reside on process p1, while object B resides on process p2. In FIG. 6B, object A invokes object B using a reference to object C as a parameter. This invocation is directed to object proxy B', which at step 61 invokes the runtime system of process p1 that determines that the reference must be passed to object B resident on process p2. At step 62, the runtime system on process p1 transmits the invocation information to the runtime system on process p2. Because the information contains a reference to object C and no object proxy C' exists on process p2, the runtime system on process p2 creates object proxy C' at step 63. The runtime system on process p2 then invokes object B substituting a reference to object C' for object C in the parameter list. If subsequently, as shown in FIG. 6C, object B uses the reference to invoke object C at step 65, object B actually will invoke object C', which in turn will delegate that call at step 66 to the runtime system on process p2. At step 67, that call is transmitted back to process p1, where the runtime system on process p1 then invokes object C on behalf of object B at step 68.

More particularly, the system and methods of the present invention enable object references to be passed through remote function calls in a reference passing process. The reference passing process enables the distributed runtime system to coordinate receipt of an object reference for an object for which a local object proxy does not exist on the local process. Referring still to FIG. 6A, in the initial states of processes p1 and p2, object A, object C, and object proxy B' reside on process p1 while object B resides on process p2, having been previously migrated from process p1 to process p2. No object C or object proxy C' exist on process p2. During the reference passing process, object A and object C execute on process p1 with the object proxy B' that also resides on process p1, whereas object B executes on the process p2.

FIG. 6B depicts an intermediate of processes p1 and p2, in which object A invokes a function on object B resident on process p2. One of the parameters to the function is a reference to object C on the process p1. This is handled on process p1 by object proxy B', which at step 61 delegates a call to the runtime system on process p1. At step 62, the runtime system on process p1 passes the reference over a network to the runtime system of the process p2, similar to the action of object A in passing the function and function parameters to object B, but with the distinction that the reference to object C is part of the function parameters passed to the runtime system on process p2. An object proxy C' is created by the runtime system on process p2 resulting from the presence of the reference to object C in the function parameters passed from process p1 to process p2, with the reference to object C in the function parameters replaced with the local reference to object proxy C'. This local reference to object proxy C' causes any invocations of functions on object C from object B on process p2 to be delegated through object proxy C'. At step 64, after the object proxy C' is created in process p2, the runtime system delegates the function invocation by object A on process p1 to object B on process p2, passing to object B the reference to object proxy C'.

With respect to FIG. 6C, invocation of object C by object B on process p2 behaves exactly as in steps 52-54 of FIG. 5C, but with object B invoking the function and object C being invoked by object B. In particular, at step 65, object B resident on process p2 invokes a function on object proxy C' on process p2. Because object C resides on process p1, and is remote relative to object B, the runtime system on process p2 determines that the function must be executed on process p1. This is determined at step 66 when object proxy C' delegates the function invocation to the runtime system on process p2. Using the globally unique identifier of object C, at step 67 the runtime system on process p2 invokes the function of object C and passes the function parameters to the runtime system of process p1 as input data. At step 86, the runtime processor on process p1 invokes the specified function on object C. The function of the object C to be invoked, and the function parameters for function invocation come from the transmitted data from the runtime system on process p2 from step 67. The function results from object C are returned to the runtime system on process p1, transmitted over the network to the runtime system on process p2, and to the object B for completing the execution of object B executing a call to object C using a passed reference to object C.

As will be apparent from the foregoing discussion, objects may be migrated between local and remote processes as in steps 41 through 43, objects can be remotely invoked by other objects as in steps 52 through 54, and remote objects can be remotely invoked calling up other remote objects as in steps 61 through 68. The ability to migrate and invoke requires locking and unlocking of the object so that no object is concurrently invoked or migrated to enable exclusive execution of object distributed about various processes. It also should be understood that the system and methods of the present invention enable all objects to be migrated from a local process to remote processes so that the local process can be shut down for maintenance while the objects are being executed on the remote processes.

Figure 7A:
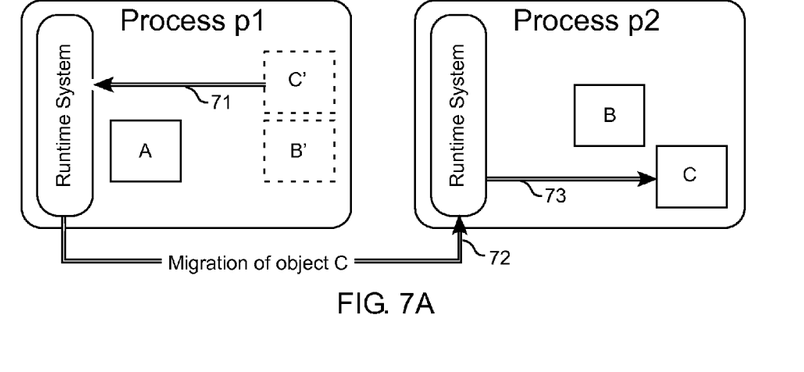
FIGS. 7A through 7C schematically illustrate a process of coordinating updates to an object represented by a local proxy object.
Figure 7B:
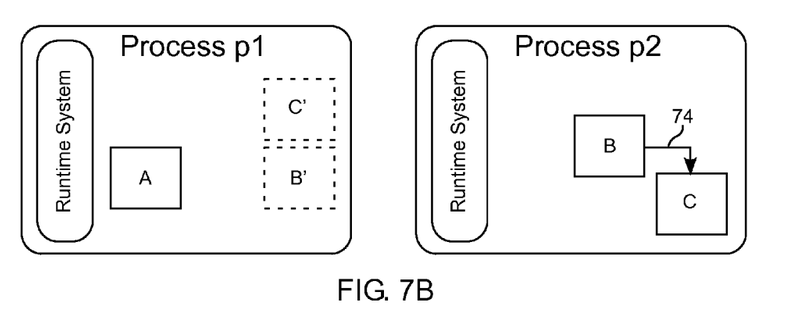

Turning now to FIGS. 7A to 7C, operation of the method of the present invention is described wherein object C of FIG. 6A subsequently is migrated to process p2. In this scenario, object C is migrated from process p1 to process p2 using steps 71 to 73, which are similar to steps 41 to 43 described above with respect to FIGS. 4A and 4B. In this case, the state of object C is transferred at step 73 into the object proxy C'. Accordingly, object C on process p1 becomes object proxy C' and object proxy C' on process p2 is changed into the actual object C. These transformations ensure that the reference from B remains valid. As depicted in FIG. 7B, object B's next invocation on object C, at step 74, is a local call because object B and object C now are co-located on process p2.

Figure 7C:
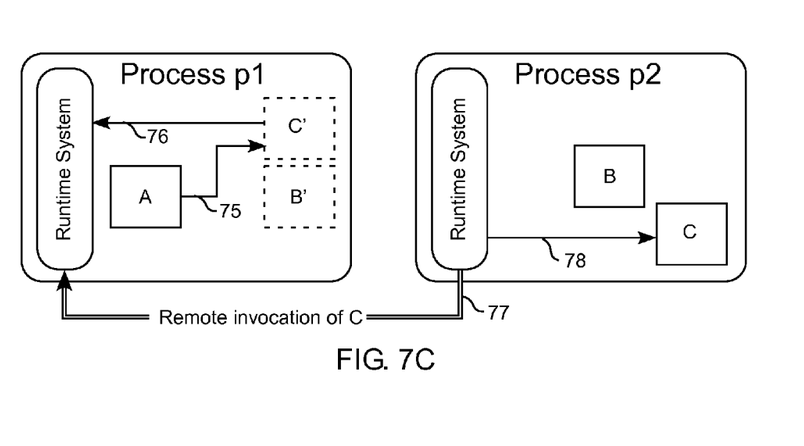

As further depicted in FIG. 7C, a further reference, at step 75, from object A on process p1 to object C remains valid, but now object A references object proxy C', which in turn invokes the runtime system on process p1 at step 76. Runtime system on process p1 passes the invocation to the runtime system on process p2 at step 76, which then invokes object C on process p2 at step 77. In this manner, any invocation from object A to object C results in a remote invocation of object C through coordination of the runtime systems on processes p1 and p2.

In accordance with another aspect of the present invention, systems and methods are provided for removing stale references so that the runtime systems can accurately track the correct states of migrated objects. Illustratively, consider an embodiment of the present invention having processes, p1, p2, and p3, in which object proxy B' residing on process p1 references object B residing on process p2. Object B then migrates to process p3, leaving proxy B" on process p2. In this case, object proxy B' has a stale reference, because object B' no longer references object B, but instead references object proxy B". In one embodiment, the runtime systems on processes p1, p2 and p3 could be actively and immediately updated to remove the stale reference, i.e., so that object proxy B' references object B on process p3.

Alternatively, because an active update process might lead to unnecessary interprocess communication overhead, it may be preferable instead for the runtime systems on processes p1-p3 to use a "lazy" update system. In this configuration, the next invocation on object proxy B' will be forwarded to object proxy B" but because object proxy B" is a proxy, the runtime system on process p1 will respond to the invocation of object proxy B" with an exception indicating the new location of object B on process p3. Object proxy B' then updates its internal state with that information and retries the invocation on object B on process p3. Even if object proxy B" is stale by the time object proxy B' invokes, e.g., because object B on process p3 has migrated again, the object proxy will reply to a remote invocation with an exception message indicating where the actual object is located based on the most recent state of the information contained within that invoked proxy object, and eventually the actual object will be invoked.

In accordance with the principles of the present invention, the ability to migrate and remotely invoke objects is enabled using class definition modifications at load time, so that, during the creation of objects, the objects contain data that is used by runtime systems resident on the processes for providing exclusive invocations and migrations. Advantageously, the original class definition code may be used, and is automatically modified at runtime for distributed processing. Legacy applications thus may be automatically distributed across hosts without reprogramming. Further, any object can be migrated in enhanced systems, so load balancing can be performed on a fine scale using external utilities to monitor program execution and migrate objects between processes as needed. System maintenance is facilitated because all objects can be migrated off of a local host process onto a remote host process.

The runtime system of the present invention may be implemented for Java programming language and Java Virtual Machines of JDK 1.5 or higher. Other implementations could be created for high-level languages such as Python and Ruby without much difficulty. Implementation for C++ applications also is possible, although such C++ implementations may require different versions for different operating systems. Those skilled in the art can make enhancements, improvements, and modifications to the invention, and these enhancements, improvements, and modifications may nonetheless fall within the spirit and scope of the following claims.

What is claimed:

1. A method for distributing processing of a single-process application in a network having local and remote processes, the single-process application comprising at least first and second objects, each of the first and second objects having pre-existing class definitions, the method comprising the steps of:

initiating a runtime system on each of the local and remote processes;

upon loading the single-process application, modifying the pre-existing class definitions to generate modified class definitions such that the runtime system is invoked when an object of that class is instantiated and at the start and end of each object function;

instantiating instances of the first and second objects on the local process using the modified class definitions;

responsive to an invocation, coordinating the runtime systems on the local and remote processes to migrate the second object instance to the remote process while transforming the second object instance on the local process into an object proxy;

executing the first object instance including invoking the second object instance on the remote process via the object proxy, invocation of the second object instance being mediated by the runtime systems on the local and remote processes;

coordinating the runtime systems on the local and remote processes to migrate the first object instance to the remote process while generating an object proxy for the first object instance on the local process; and after migrating the first object instance to the remote process, shutting down the local process without disrupting execution of the application.

2. The method of claim 1, wherein the modified class definitions of each of the first and second object instances includes a call to the runtime system to identify and initiate tracking of the first and second object instances.

3. The method of claim 1, wherein the modified class definitions of each of the first and second object instances includes a call to the runtime system for each function that invokes another object instance during execution.

4. The method of claim 1, wherein the runtime systems of the local and remote processes apply a lock to the second object instance during invocation by the first object instance.

5. The method of claim 1, wherein executing the first object instance including invoking the second object instance comprises calling the runtime system on the local process to determine the location of the second object instance.

6. The method of claim 1, wherein executing the first object instance including invoking the second object instance comprises:

executing the first object instance to invoke the object proxy on the local process;

executing a call by the object proxy to the runtime system on the local process;

transferring information required to invoke the second object instance from the runtime system on the local process to the runtime system on the remote process; and executing the second object instance on the remote process.

7. The method of claim 1, further comprising:

communicating a result from execution of the second object instance on the remote process to the object proxy via the runtime systems on the remote and local processes; and returning the result from the object proxy to the first object instance.

8. The method claim 1, wherein the migrating the second object instance to the remote process further comprises balancing processor loads between the local and remote processes.

9. The method of claim 1, wherein the local process is shut down for maintenance.

10. A computer system that enables distributed processing of a single-process application, the single-process application comprising at least first and second objects using first and second processes, each of the first and second objects having pre-existing class definitions, the computer system comprising:

a runtime system;

a class modifier routine programmed to modify the pre-existing class definitions to generate modified class definitions upon loading the single-process application such that the runtime system is invoked when an object of that class is instantiated and at the start and end of each object function; and at least one processor configured to execute the single-process application, the class modifier routine, and the first and second processes, and to instantiate the first and second objects using the modified class definitions, the runtime system being programmed to identify and track at least the second object instance, to migrate the second object instance from the first process to the second process, and to transform the second object instance on the first process into an object proxy responsive to an invocation, the processor being configured to execute instances of the runtime system associated with each of the first and second processes and to execute the first object instance including invoking the second object instance on the second process via the object proxy, the invocation of the second object instance being mediated by instances of the runtime system associated with each of the first and second processes, and the processor further being configured to coordinate the instances of the runtime system associated with the first and second processes to migrate the first object instance to the second process while generating an object proxy for the first object instance on the first process and, after migrating the first object instance to the second process, to shut down the first process without disrupting execution of the application.

11. The computer system of claim 10, wherein the processor is configured to execute the class modifier routine so that the modified class definitions of each of the first and second object instances includes a call to the runtime system to identify and initiate tracking of the first and second object instances.

12. The computer system of claim 10, wherein the processor is configured to execute the class modifier routine so that the modified class definitions of each of the first and second object instances includes a call to the runtime system for each function that invokes another object instance during execution.

13. The computer system of claim 10, wherein the processor is configured to execute the runtime system associated with each of the first and second processes to apply a lock to the second object instance during invocation by the first object instance.

14. The computer system of claim 10, wherein the processor is configured to execute the first object instance including invoking the second object instance by calling the runtime system on the first process to determine the location of the second object instance.

15. The computer system of claim 10, wherein the processor is configured to execute the first object instance including invoking the second object instance by:

executing the first object instance to invoke the object proxy on the first process;

executing a call by the object proxy to the runtime system on the first process;

transferring information required to invoke the second object instance from the runtime system associated with the first process to the runtime system associated with the second process; and executing the second object instance on the second process.

16. The computer system of claim 10, wherein the processor further is configured to execute the first object instance including invoking the second object instance by:

communicating a result from execution of the second object instance on the second process to the object proxy via the runtime systems associated with the first and second processes; and returning the result from the object proxy to the first object instance.

17. The computer system of claim 10, wherein the processor is configured to migrate the second object instance to the second process, thereby enabling balancing of loads between the first and second processes.

18. The computer system of claim 10, wherein the processor further is configured to coordinate execution of the runtime systems associated with the first and second processes to migrate the first object instance to the second process while generating an object proxy for the first object instance on the first process.

19. The computer system of claim 10, wherein the computer system further comprises a second processor, the second processor configured to enable migration of the first and second object instances to the second processor.

20. The computer system of claim 10, wherein the processor is configured to shut down the first process for maintenance.

* * * * *